March 31, 1931.  W. SCHÄFER  1,798,634
ROTATABLE STAGE FOR MICROSCOPES
Filed Feb. 14, 1929  2 Sheets-Sheet 1

INVENTOR

Patented Mar. 31, 1931

1,798,634

UNITED STATES PATENT OFFICE

WILLY SCHÄFER, OF WETZLAR, GERMANY, ASSIGNOR TO THE FIRM ERNST LEITZ, OPTISCHE WERKE, OF WETZLAR, GERMANY

ROTATABLE STAGE FOR MICROSCOPES

Application filed February 14, 1929, Serial No. 339,949, and in Germany May 29, 1928.

This invention relates to a rotatable stage for microscopes.

The object of the present invention is the construction of a rotatable stage in which the friction is reduced to a minimum and a true rotation secured, all unnecessary play between the parts being eliminated.

According to this invention the rotatable stage is mounted upon a number of balls which are free to rotate in any direction. The balls are provided with a cage and they are mounted in an annular race formed between a flange or ring attached to the under surface of the stage plate and a relatively fixed ring. The rotation thus takes place on a ring of balls which provide for radial and axial stresses.

Figure 1:
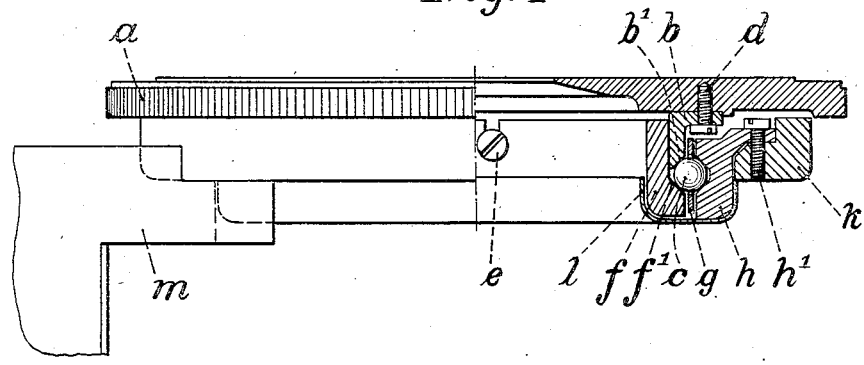
Figure 2:
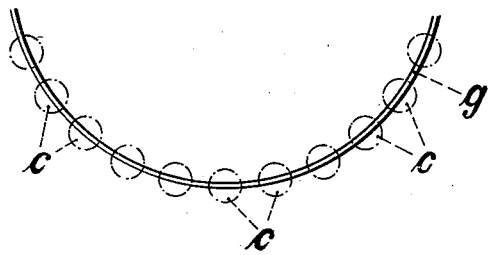
Figure 3:
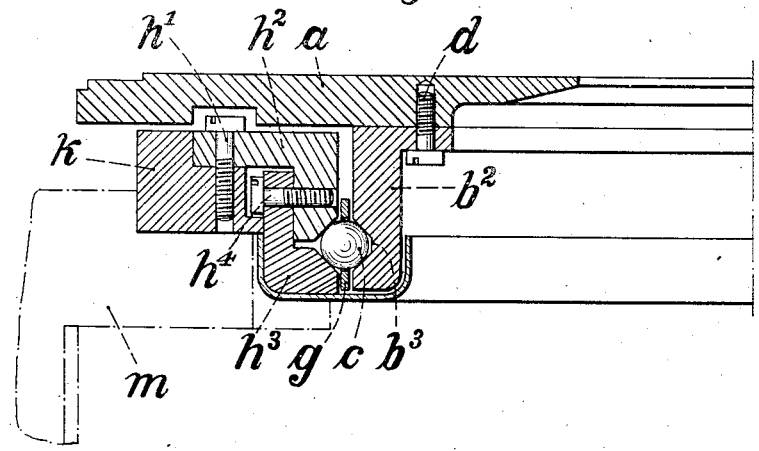
Figure 4:
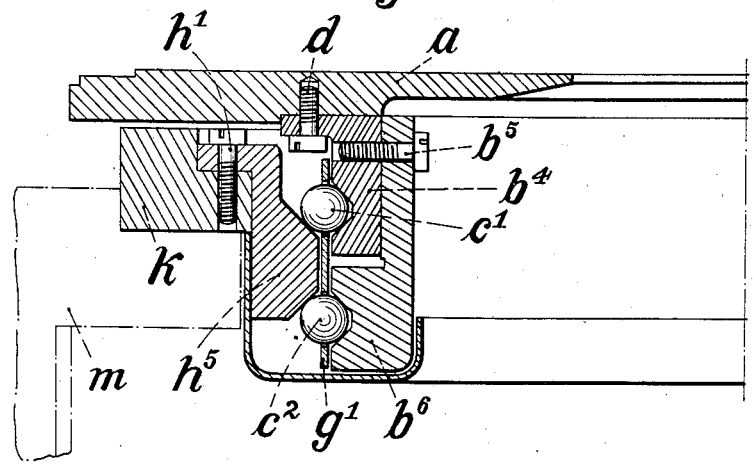

In the accompanying drawings,

Figure 1 is an elevation with parts in section of one construction of rotatable stage according to this invention, Figure 2 is a partial plan view of same of the balls and their cage, and Figures 3 and 4 are views similar to Figure 1 but illustrating modified constructions of rotatable stages also according to this invention.

With reference first to Figures 1 and 2, $a$ is the rotatable member or object-carrying plate of the stage. It is provided on its under surface with a flanged ring $b$ having a surface $b^1$ which rests upon a number of balls $c$. The ring $b$ is detachably connected to the plate $a$ by screws $d$ and attached to the ring $b$ by screws $e$ is an inner ring $f$ having a surface $f^1$ which cooperates with the surface $b^1$ to form an annular V-shaped recess. The balls $c$ are provided with a cage $g$ and they run in an annular V-shaped recess in a member $h$ fixed by screws $h^1$ to an outer ring $k$ secured to the microscope stand $m$. An annular cap $l$ covers the lower part of the members $f$ and $h$. It will be seen that by this construction, whilst perfectly free and frictionless rotation of the plate $a$ in a horizontal plane is provided for, all movement or rock in a vertical plane is prevented. It will also be seen that adjustment between the surfaces $b^1$ and $f^1$ is possible.

In the construction illustrated in Figure 3 the ring $b^2$ attached to the plate $a$ by the screws $d$ has a V-shaped annular recess $b^3$ and the outer member of the ball race is made in two parts, one being a ring $h^2$ secured by the screws $h^1$ to the fixed part $k$ and the other a ring $h^3$ adjustably connected to the ring $h^2$ by screws $h^4$.

Figure 4 shows another modification in which there are two rings of balls $c^1$ and $c^2$ in a cage $g^1$. The outer surfaces of these balls run on oblique bearing surfaces on a ring $h^5$ secured to the fixed member $k$ by the screws $h^1$. The inner surfaces of the upper ring of balls $c^1$ run in a V-shaped race in a ring $b^4$ attached to the plate $a$ by the screws $d$, and to this ring $b^4$ is adjustably secured by screws $b^5$ a ring $b^6$ with a V-shaped race in which the lower ring of balls $c^2$ run.

This construction is given as an example in which there are more than one ring of balls, but in the preferred practical constructions a single ring of balls is used as it enables the rotating stage to be made of less depth and consequently does not require the mountings of the sub-stage condensers or other sub-stage fittings to be of more than the ordinary depth.

Having thus described my invention what I claim as new and desire to secure by Letters Patent is:

1. In a device of the character described, a fixed support, a microscope stage mounted to rotate with respect thereto, a member secured to the support and provided with an interior annular ball race, other members secured to the said stage and forming an exterior annular ball race cooperating with the said interior ball race and balls interposed between said interior and exterior ball races in contact therewith.

2. In a device of the character described, a fixed support, an annular ball race member secured thereto, balls in said race, a microscope stage, annular ball race members secured thereto and cooperating with the said first named ball race member to form an enclosed ball race and a plurality of balls in the latter in contact with the said ball race members.

3. In a device of the character described, a microscope stage, a first ball race member secured thereto having an outer inclined ball race surface, a second ball race member adjustably secured to the said first member and having an inclined ball race surface cooperating with the said first inclined surface to form an inner V-shaped ball race, a third fixed annular ball race member having a V-shaped ball race opposed to and cooperating with the said first named V-shaped ball race and a plurality of balls running within and in contact with the said two V-shaped ball races.

4. In a device of the character described, a microscope stage, ball race members secured thereto to form an exterior V-shaped groove, means for adjusting the opposed inclined sides of the said groove, a fixed member providing a V-shaped groove opposed to the said first named groove and balls within and in contact with all four sides of the said grooves.

5. In a device of the character described, a rotatable stage for a microscope, a plurality of ball races and balls forming a ball bearing for supporting said rotatable stage and preventing lateral and vertical movement thereof and a fixed support for said ball races.

Signed at Frankfort-on-the-Main, Germany, in the Province of Hessen-Nassau and State of Prussia this seventh day of January A. D. 1929.

WILLY SCHÄFER.